(12) United States Patent
Kajiwara et al.

(10) Patent No.: US 6,268,579 B1
(45) Date of Patent: Jul. 31, 2001

(54) VACUUM SWITCHGEAR

(75) Inventors: Satoru Kajiwara; Toru Tanimizu; Yoshiyasu Watanabe; Yozo Shibata; Ayumu Morita, all of Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/509,638

(22) PCT Filed: Sep. 28, 1998

(86) PCT No.: PCT/JP98/04336

§ 371 Date: Mar. 31, 2000

§ 102(e) Date: Mar. 31, 2000

(87) PCT Pub. No.: WO99/18591

PCT Pub. Date: Apr. 15, 1999

(30) Foreign Application Priority Data

Oct. 3, 1997 (JP) .................................................. 9-270826

(51) Int. Cl.$^7$ .................................................. H01H 33/02
(52) U.S. Cl. ........................................... 218/153; 218/120
(58) Field of Search .................................. 218/118, 120, 218/123, 140, 154, 143, 155, 139

(56) References Cited

U.S. PATENT DOCUMENTS

| | | | |
|---|---|---|---|
| 4,192,572 | * | 3/1980 | Stager et al. .......................... 218/120 |
| 4,233,480 | * | 11/1980 | Hruda .................................... 218/120 |
| 5,719,365 | * | 2/1998 | Tanimizu et al. ..................... 218/118 |

FOREIGN PATENT DOCUMENTS

| | | |
|---|---|---|
| 55-143727 | 11/1980 | (JP) . |
| 59-75527 | 4/1984 | (JP) . |
| 3-273804 | 12/1991 | (JP) . |
| 9-153320 | 6/1997 | (JP) . |

* cited by examiner

*Primary Examiner*—Lincoln Donovan
(74) *Attorney, Agent, or Firm*—Mattingly, Stanger & Malur, P.C.

(57) ABSTRACT

A vacuum switch gear provided with a vacuum container grounded within a grounded vacuum container or a gas-insulated ground container, and a pair of buses connected to an external conductor of the switch gear. A portion for connecting the buses and the external conductor is interface insulation in which an elastic body and solid insulation are utilized in combination. The interface insulation performs adhering and tightening work by rotating an adjuster from the outside.

13 Claims, 7 Drawing Sheets

VACUUM SWITCHGEAR

TECHNICAL FIELD

The present invention relates to a vacuum switch gear and a vacuum switch gear unit capable of easily connecting an integrated container in which a grounded vacuum container or a vacuum container and a gas-insulated ground container are utilized in combination, to buses, and a vacuum switch gear system wherein the units are connected to one another.

BACKGROUND ART

With an increase demand for power consumption centralized areas in cities, the attainment of a rise in distribution voltage, i.e., positive load absorption into a 22KV system large in capacity per line, rather than a 6KV one due to a difficulty in the siting of a 6KV supply-based distributing substation, no allowance for the placement of distributing piping and an increase in availability factor of a 6KV supply installation, etc., leads to the formation of an efficient power supply installation. It is therefore necessary to bring 22KV distribution equipment into compact form like compact 7KV to 6KV equipment.

An $SF_6$ gas-insulated switch gear described in, for example, Japanese Patent Laid-Open No. Hei 3-273804 is considered as power receiving and transforming equipment to, be brought into compact form. In this type of switch gear, a unit room or chamber charged with an insulation gas is fabricated and held in a distribution box, and a breaker, two disconnectors and a ground switch are individually manufactured and accommodated in bus rooms or chambers. When a vacuum breaker is used as the breaker, a movable electrode is moved upward and downward with respect to a fixed electrode by an operation unit of the vacuum breaker to thereby perform throwing and cutting-off. According to a vacuum breaker described in Japanese Patent Laid-Open No. Sho 55-143727 as an alternative to above, a movable electrode is turned vertically or horizontally with a main shaft as the fulcrum so as to be connected to or disconnected from a fixed electrode, whereby throwing and cutting-off are carried out.

The gas-insulated switch gear receives power supplied from, for example, an electric power company through a disconnector and a gas breaker or the like, transforms it into the optimum voltage for a load by a transformer and supplies power to a load, e.g., a motor or the like. The power receiving and transforming equipment is maintained and checked as follows. After a gas breaker has been cut off, a disconnector provided separately from the gas breaker is rendered open and a ground switch is further grounded to thereby allow the residual charge on the source side and induced current to flow into ground. Thus, the re-application of the voltage from the source is prevented to keep the safety of a worker. Grounding the ground switch while a bus remains charged leads to an accident. Therefore, an interlock is provided between the disconnector and the ground switch.

In $SF_6$ gas-insulated switching equipment described in, for example, Japanese Patent Laid-Open No. Hei 3-273804, a unit room or chamber charged with an $SF_6$ gas is fabricated and held in a distribution box, and a gas breaker, two disconnectors and a ground switch are individually manufactured and accommodated in bus rooms or chambers respectively. When a vacuum breaker is used as the breaker, a movable electrode lying within a vacuum container is moved upward and downward with respect to a fixed electrode by an operation unit to thereby perform throwing and cutting-off. According to a vacuum breaker described in Japanese Patent Laid-Open No. Sho 55-143727 as an alternative to above, a movable lead corresponding to a movable blade and a movable electrode lying within a vacuum container are turned from side to side with a main shaft as the fulcrum so as to be connected to or disconnected from a fixed electrode, whereby throwing and cutting-off are carried out. Further, a rod extends outside a vacuum container described in Japanese Patent Laid-Open No. Sho 59-75527 from the back of each of a movable electrode and a fixed electrode lying within the vacuum container. However, any of these publications does not take into consideration a portion for connecting a source-side conductor and a source bus. While a vacuum switch gear enclosed in a gasinsulated container has been described in Japanese Patent Laid-Open No. Hei 9-153320, it does not take into consideration a portion for connecting a source-side conductor and a source bus in a manner similar to the above.

An object of the present invention is to provide a vacuum switch gear capable of easily performing a connection between a bus or source-side bus and a grounded vacuum container or integrated container, a vacuum switch gear wherein a plurality of vacuum switches are provided in cooperation with one another, a vacuum switch gear unit, and a vacuum switch gear system. In the present invention, a vacuum container may be grounded. Alternatively, the vacuum container may be one placed within a gas-insulated container which is grounded.

DISCLOSURE OF INVENTION

The present invention provides a vacuum switch gear comprising (1) a vacuum switch having a vacuum container, a fixed electrode connected to within the vacuum container, a movable electrode connected to or disconnected from the fixed electrode, a load conductor electrically connected to the movable electrode, and an external conductor electrically connected to the fixed electrode, (2) an operation mechanism unit for driving the movable electrode, and (3) buses each electrically connected to the external conductor, and also provides a vacuum switch gear unit wherein a plurality of the vacuum switch gears each referred to above are brought into unit form. Further, the vacuum switch gears brought into unit form are connected to other units through buses, thereby making it possible to constitute an intended vacuum switch gear system. In the present invention, a connecting portion for connecting the external conductor extending from the vacuum container and each bus is one wherein the buses extending in a direction horizontal to the longitudinal axis of the external conductor and a connecting end of the external conductor are surrounded by interface insulation. While an interface insulating method has already been known as a connecting method such as a cable head or the like, the present invention makes use of this interface connection to ensure the connection between the vacuum switch and each bus. The interface connection is a connecting method of forcibly press-fitting an elastic body such as rubber between a hard solid insulator such as ceramics, a resin or the like and a wall (or container wall) for surrounding a connecting portion and firmly closely-fitting an interface between the fixed insulator and the elastic body to thereby increase withstand pressure. As an independent improvement in elastic body according to the present invention, the connecting portion is provided with a press-fit operation unit to press-fit the elastic body from the outside of the connecting portion. A greater advantage of the present invention resides in that the grounded vacuum container and the connecting structure can be rendered substantially identical to each other in structure. Thus, a vacuum switch, an operation-mechanism, a controller, a connecting portion and buses are respectively prepared in plural sets. They can be easily assembled so as to constitute an intended circuit or line. Consequently, the vacuum switch gear, the vacuum switch gear unit and the vacuum switch gear system can be reduced in manufacturing cost.

In the present invention, butt ends of a pair of bus conductors extending in a direction orthogonal to a longitudinal direction of superimposed external conductors or in their transverse direction are superimposed on each other as connecting pieces at an end of the superimposed external conductors. A fastening or tightening device such as a bolt is inserted into a through hole defined in the superimposed portion. The fastening device is tightened by a nut or the like so as to fix between the connecting pieces. A solid insulator of a connecting structure of a bus employed in the present invention has a slope or inclined surface in which a sectional area thereof successively decreases as it goes toward the center of the connecting portion. By press-fitting a screw or the like in an elastic body, the fastening device draws the elastic body and the solid insulator to allows the two to forcibly adhere to each other. In the connecting structure of the present invention, ground metallic powder is mixed into the surface of an insulation supporting portion and/or elastic body (insulated cover) and may be grounded in contact with a conductive cover. A method of insulating a bus itself may be solid insulation using an epoxy resin, gas insulation filled with an $SF_6$ gas or vacuum insulation constructed as a vacuum container. The present invention can be applied even to an integrated vacuum switch gear described in Japanese Patent Laid-Open No. Hei 9-153320, wherein a vacuum container for accommodating a movable electrode and a fixed electrode is placed within the gas-insulated container.

BEST MODE FOR CARRYING OUT THE INVENTION

Figure 1:
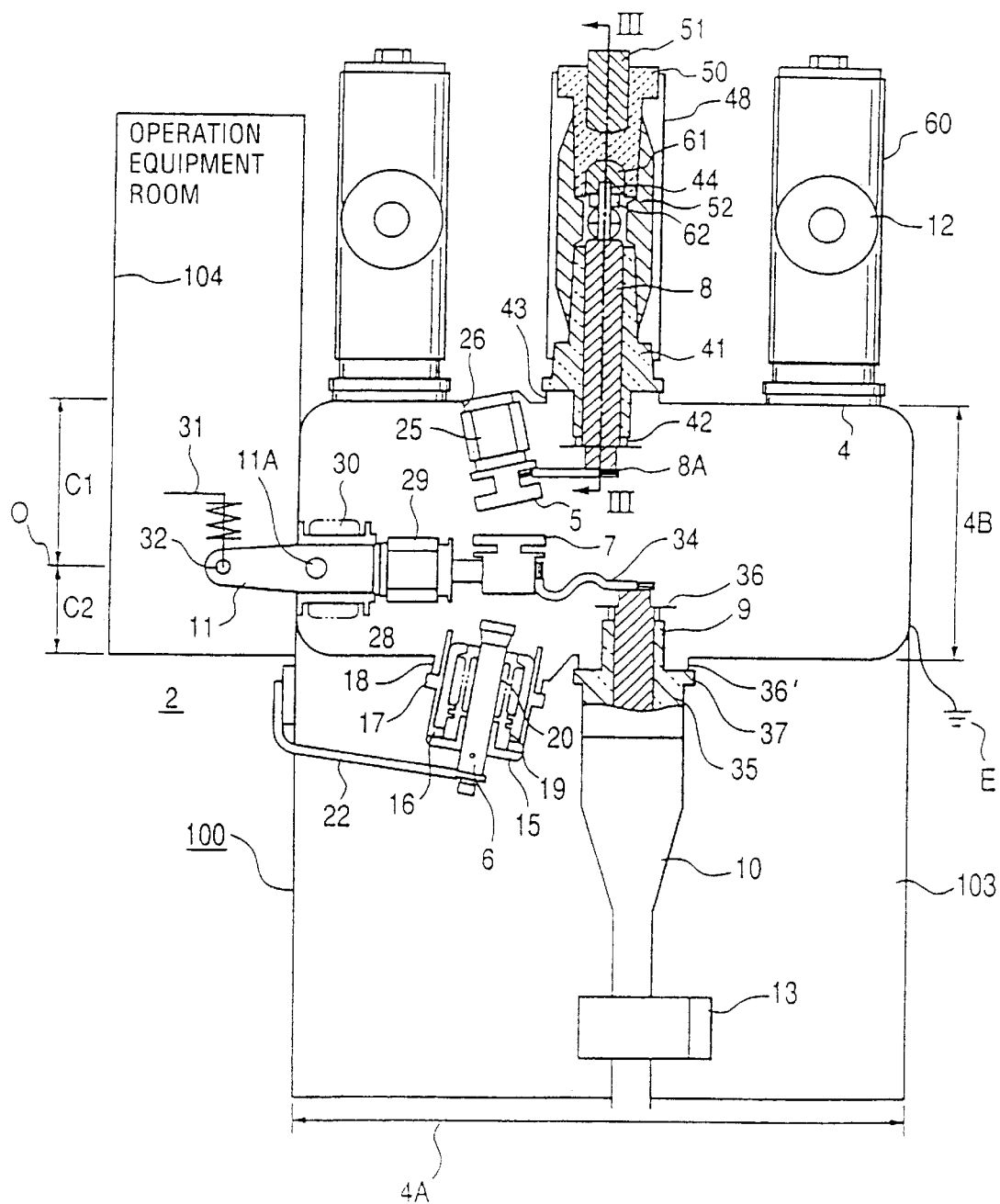
FIG. 1 is a cross-sectional side view of a three-phase vacuum switch gear (vacuum switch gear unit) according to an embodiment 1 of the present invention.

Embodiments of the present invention will hereinafter be described with reference to the accompanying drawings. In FIG. 1, a vacuum container or housing 4 is connected to ground E. A fixed electrode 5 is fixed thereinside to the vacuum container 4 through an insulated cylinder 25 and a fixing-side closing fitting 26. The fixed electrode 5 is connected to an end of an external conductor (conductor on the source side) 8 through a conductor 8B by brazing. The external conductor 8 extends through the vacuum container 4 and is fixed thereto by means of closing fittings 42 and 43 and an insulative supporting portion 41. The supporting portion 41 surrounds the external conductor 8 and has a cross section which is reduced toward the center of a connecting portion. As to the connecting portion, an elastic body 52 such as rubber firmly restrains the connecting portion. The solid insulation 41 and the elastic body 52 tightens a fastening device or clamp 44 by means of a fastening fitting 51 to thereby allow it to adhere to a cover 48 (made of stainless steel) and solid insulation. The surface of the rubber 52 and the surface of a lower end of the supporting portion 41 are given conductivity and grounded by the cover 48.

Figure 2:
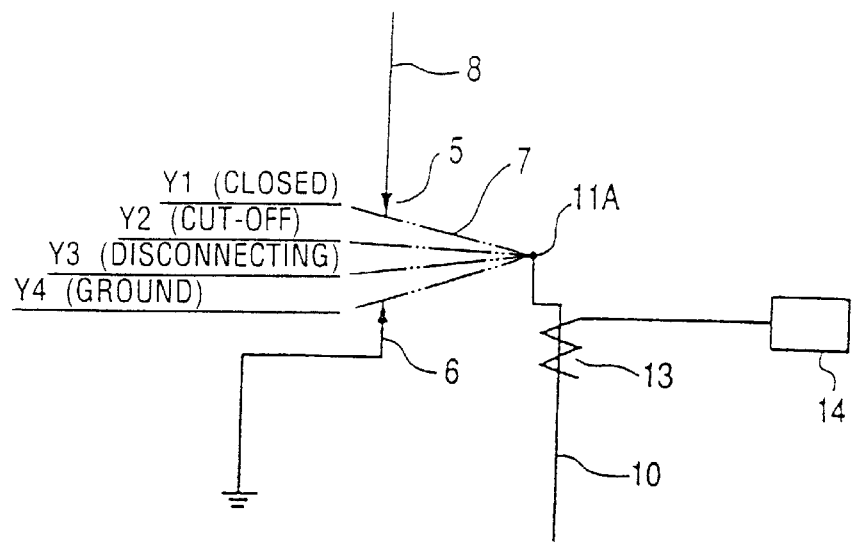
FIG. 2 is a circuit diagram for describing the motion of a movable contact shown in FIG. 1.

A movable electrode 7 is electrically connected to a load conductor 9 by means of a flexible conductor 34 or the like. The movable electrode 7 is connected to a movable blade 11 with a moving-side insulated cylinder 29 interposed therebetween. The movable blade 11 is connected to the vacuum container 4 through a bellows 30 and rotated in upward and downward directions as viewed from the drawing with a shaft 11A as a fulcrum. A ground conductor 6 is fixed to the vacuum container by a bellows 19 or the like inserted into a case 15. As shown in FIG. 2, the movable electrode 7 is capable of assuming four positions: a closed position Y1 at which it contacts the fixed electrode 5, a cut-off position Y2 at which it is spaced away from the fixed electrode 5 so as to cut off current, a disconnecting position Y3 at which it is spaced away from the fixed electrode 5 so as to maintain isolation, and a ground position Y4 at which it contacts the ground conductor 6, or three positions of Y1, Y2 and Y4. It is therefore possible to give a plurality of functions (a breaker, a disconnector, an earthing or grounding device, etc., or the breaker, grounding or earthing device, etc.) to one vacuum switch and bring the vacuum switch into much less size.

The present invention can be applied not only to the vacuum switch gear having the plurality of functions shown in FIG. 1 but to a vacuum switch gear having a single function. In this case, a movable electrode 7 and a fixed electrode 5 are installed in one vacuum container, whereas a ground conductor and a contact corresponding thereto are provided in the other vacuum container. Two grounded vacuum containers may be rendered independent of each other with an insulation wall interposed therebetween.

The movable blade 11 is driven by a drive mechanism 31 coupled to a shaft 32. The drive mechanism is accommodated in an operation compartment or an operation equipment room 104. The movable blade 11 is moved in such a manner that current flowing through the load conductor 10 is detected by a current transformer 13 to thereby operate a protection relay 14, whereby an operation mechanism is activated so as to cope with an accident in a system.

Figure 8:
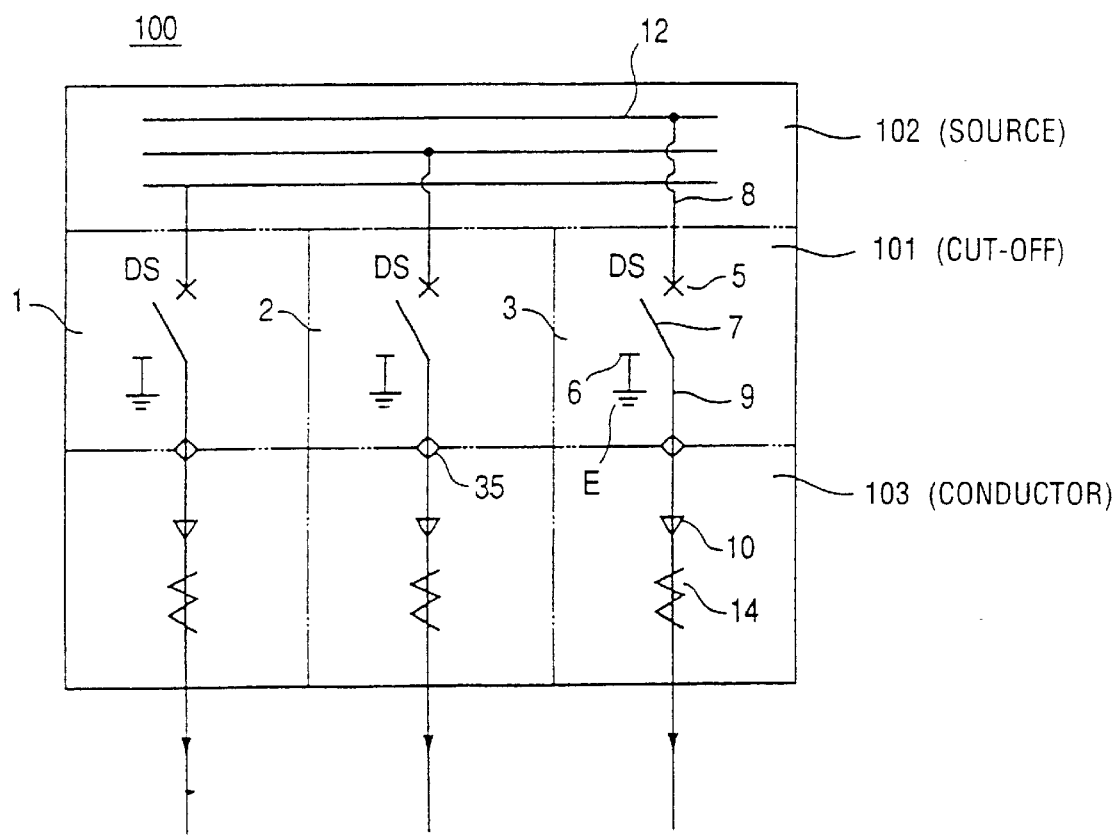
FIG. 8 is a circuit diagram of the vacuum switch gear unit shown in FIG. 1.

The load conductor 9 is inserted into a cable head 10. The cable head 10 is inserted into a solid insulator 34 such as bushing. The solid insulator has a section structure similar to the solid insulator 41 of the connecting portion. Further, a flexible insulator such as rubber surrounds the periphery of the solid insulator 35 and adheres to the solid insulator, thereby forming interface or interfacial insulation. The vacuum switch gear shown in FIG. 1 is provided with a conductor compartment 103. FIG. 8 is a circuit diagram of the phase separation type ground vacuum switch gear of FIG. 1 showing a block skeleton in which vacuum switch gears are collected. The vacuum switch gear 100 shown in FIG. 8 has a source-side compartment 102 and a conductor compartment 103 respectively provided on the upper and lower sides of a cut-off portion compartment 101 in which the grounded vacuum container 4 has been accommodated. Vacuum buses 12 placed within the source-side compartment 102 are respectively connected to three-phase phase separation ground type vacuum switch gears 1, 2 and 3 (hereinafter called "vacuum switch gears") inside the grounded vacuum container 4 of the cut-off portion compartment 101. Further, the vacuum buses 12 are respectively connected to load-side conductors 9 and cable heads 10 lying within the vacuum switch gear 2 and the conductor compartment 103. Each individual grounded vacuum containers 4 are respectively coupled to ground E and include the three-phase vacuum switch gears 1, 2 and 3 provided thereinside.

Figure 4:
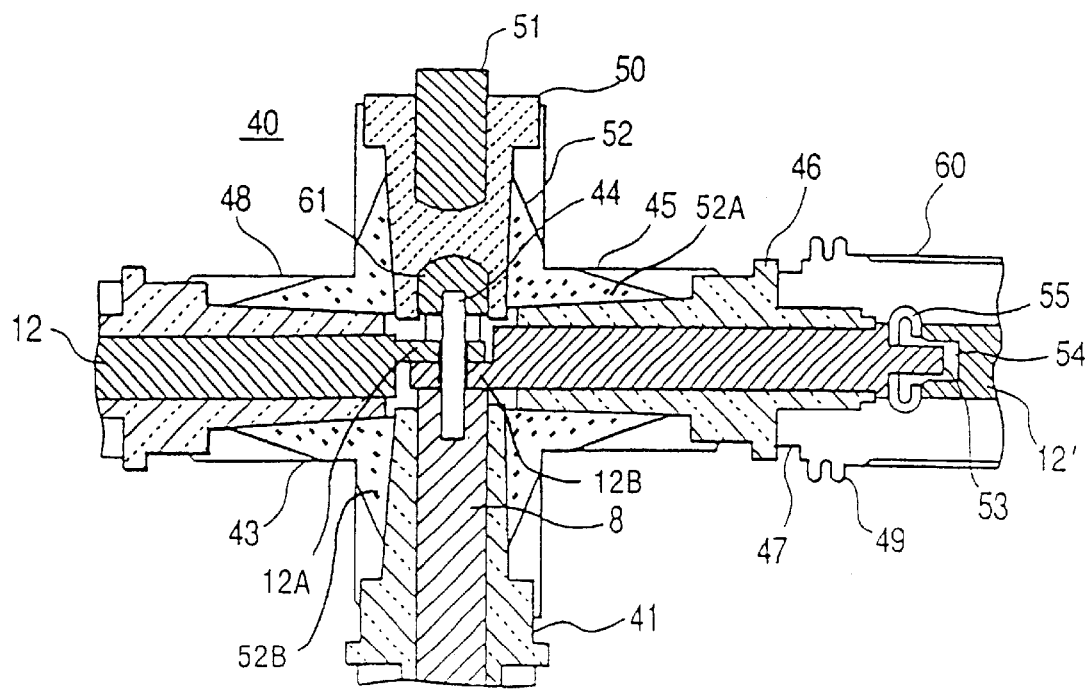
FIG. 4 is a fragmentary detailed cross-sectional view of a connecting portion shown in FIG. 3.
Figure 3:
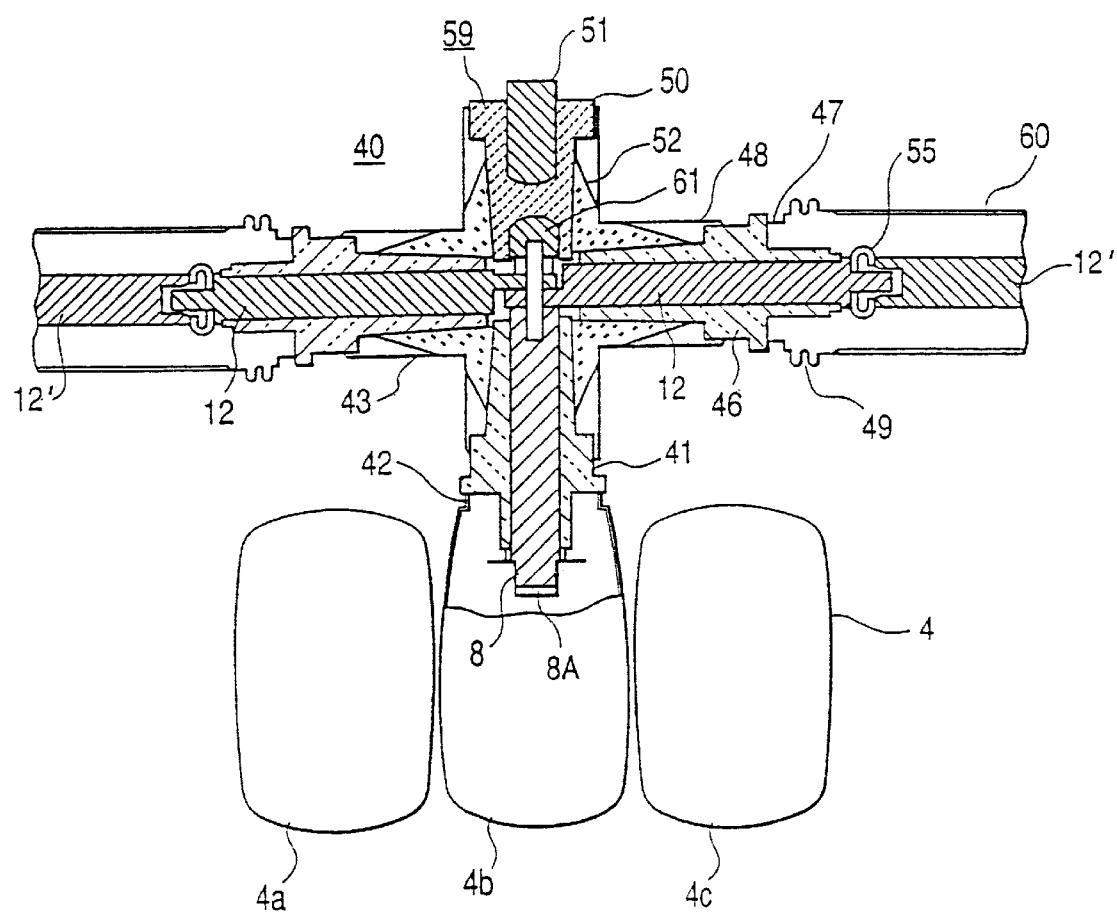
FIG. 3 is a cross-sectional view taken along line III—III of the three-phase vacuum switch gear shown in FIG. 1.

FIG. 3 is a cross-sectional view taken along line III—III of FIG. 1, and FIG. 4 is an enlarged cross-sectional view of a fragmentary portion thereof. A sectional structure of each vacuum container 4 has a structure long in a vertical direction as shown in the drawing. When the vacuum containers 4 are placed in parallel, they are set so as not to increase the installation areas thereof in a horizontal direction. Since the vacuum switches are respectively substantially identical in structure to one another along with grounded vacuum containers 4a, 4b and 4c, the grounded vacuum containers 4a and 4c will not be described. A bolt 44 is inserted into the end of the external conductor 8 extending from the grounded vacuum container 4b. A pair of buses 12 is connected to the bolt 44 from side to side. As to their connecting portions, the end of one of the connecting conductors 12 is rendered thin and the end of the other thereof is made thin in the center of the connecting conductor 12, thereby forming projections 53. An end of a bus conductor (vacuum bus) 12' is flexibly coupled to its corresponding end by a connecting portion 55. The bus conductor 12' and its corresponding connecting conductor 12 are hermetically covered with outer housings 60 and 48. An integrally-formed one (corresponding to a pair of bus assemblies) of the bus conductor 12', connecting conductor 12, outer housings 60 and 48, bushing 46, bellows 49 and closing fitting 47 is prepared in advance.

A through hole defined in an end of the pair of bus assemblies is insertably fit on the bolt 44 inserted into the end of the external conductor 8. The tip of the bolt 44 is threaded in a screw hole defined in a tap 61 of a holder 59 integrated by molding the tap 61 and an adjuster 51 under the rotation of the holder 59. Consequently, the bolt 44 is inserted into the tap 61 through a washer 62 so that the bushings 41 and 50 and the elastic body 52 adhere to each other. Both ends of the bus conductor 12' take the same form as shown in the drawing and is connected to its corresponding connecting conductor 12. At least two vacuum switch gears each constructed in the above-described manner are utilized in combination and the resultant one will be defined as a vacuum switch gear unit.

Figure 5:
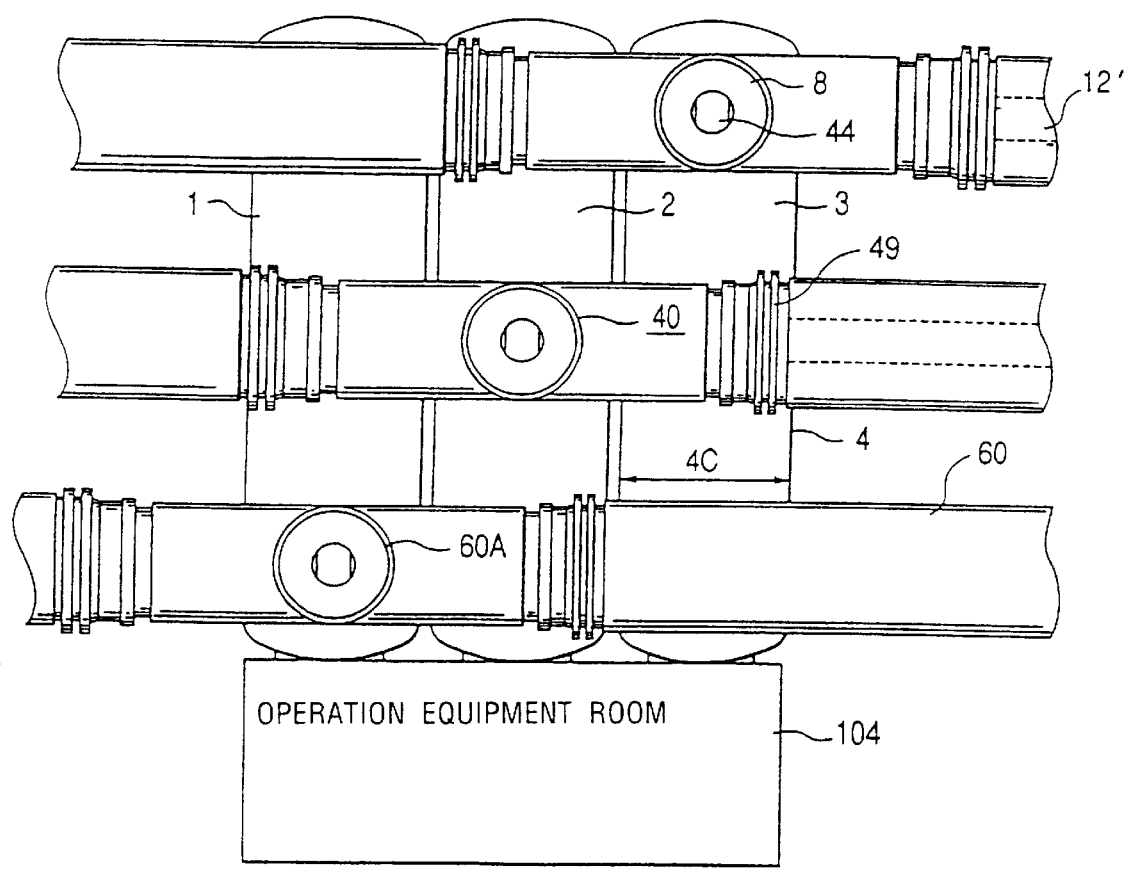
FIG. 5 is a plan view of FIG. 1.
Figure 6:
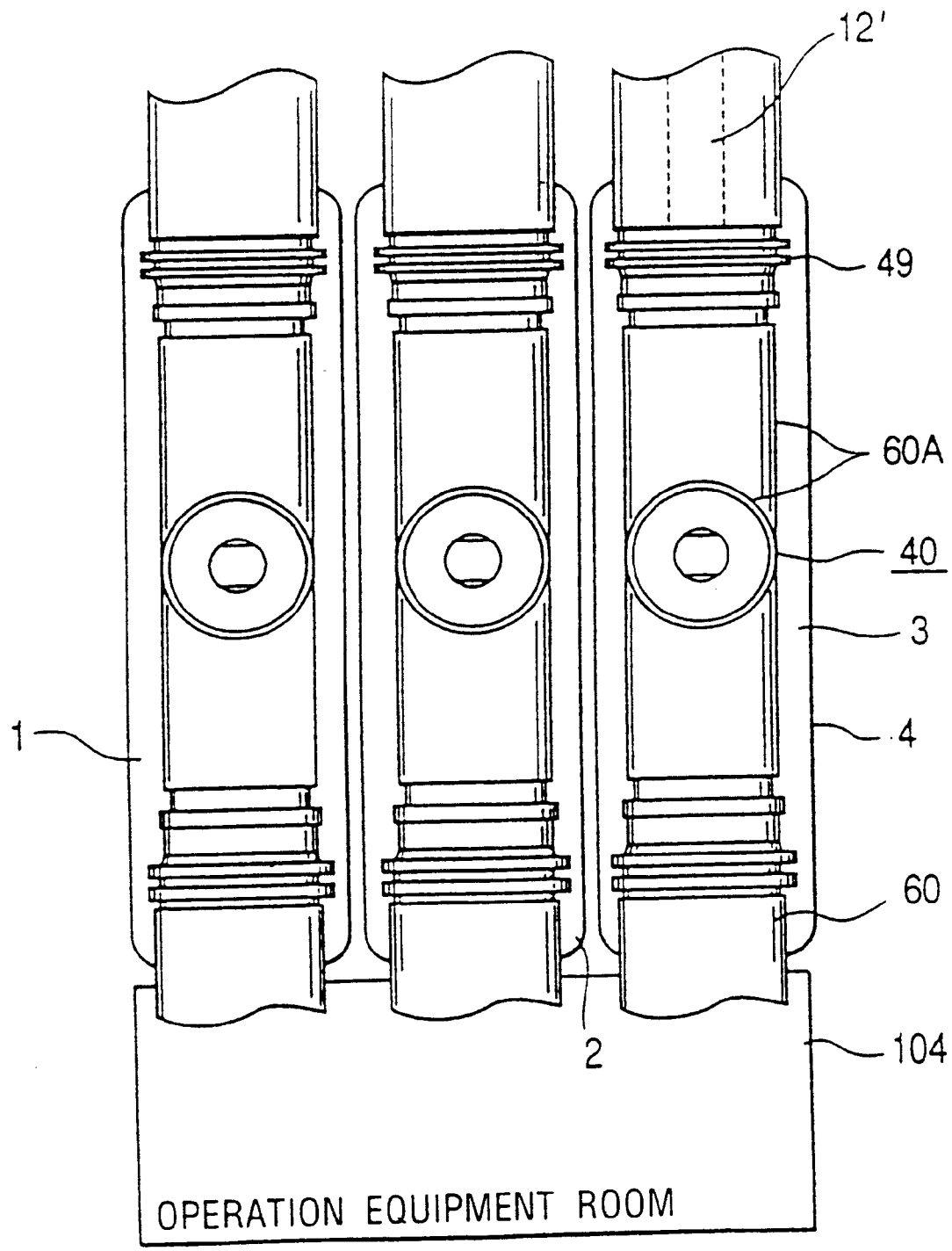
FIG. 6 is a plan view of a three-phase vacuum switch gear (vacuum switch gear unit) according to another embodiment.

FIG. 5 is a plan view showing the three-phase phase separation type ground vacuum switch gear unit shown in FIG. 1 and the vacuum buses as viewed from above. Three grounded vacuum containers 1, 2 and 3 are arranged in parallel. Since each individual connecting portions 40 for the vacuum buses are placed in positions different as viewed in the longitudinal directions of the grounded vacuum containers 1, 2 and 3, the bus conductors 12' are easy to connect to another vacuum switch gear unit and hence can be plane-connected or two-dimensionally connected. On the other hand, since the connecting positions of the buses are all the same as viewed in longitudinal directions of grounded vacuum containers 1, 2 and 3 in FIG. 6 showing another embodiment, the buses are connected to their corresponding vacuum switch gear unit through an operation unit 104. As a result, an extra space therefor is required. However, if the operation unit 104 is placed in a space different from that for each grounded vacuum container, e.g., a space located above the grounded vacuum containers, it is not necessary to provide a plane space for the operation unit. In this case, the placement of the buses extending from the connecting portions is contrived and the buses are bent horizontally or vertically, whereby a plurality of vacuum switch gears can be simply disposed in parallel. It is thus possible to provide a vacuum switch gear unit and a vacuum switch gear system both extremely small in occupied area and volume.

The vacuum switch gear 100 shown in FIG. 1 is provided with a source-side compartment 102 and a conductor compartment 103 respectively provided on the upper and lower sides of a cut-off portion compartment 101 in which the grounded vacuum container 4 has been accommodated. Vacuum buses 12' placed within the source-side compartment 102 are respectively connected to three-phase phase separation ground type vacuum switch gears 1, 2 and 3 (hereinafter called "vacuum switch gears") inside the grounded vacuum container 4 of the cut-off portion compartment 101. Further, the vacuum buses 12' are respectively connected to load-side conductors 9 and cable heads 10 lying within the vacuum switch gear 2 and the conductor compartment 103. Each individual grounded vacuum containers 4 are respectively coupled to ground E and include the three-phase vacuum switch gears 1, 2 and 3 placed thereinside.

Since the respective phase vacuum switch gears 1, 2 and 3 are identical in structure to one another, the vacuum switch gear 2 will be explained and the description of other vacuum switch gears will be omitted. The vacuum switch gear 2 is one in which a cut-off function, a disconnecting function, a ground function and buses are integrally collected. The vacuum switch gear 2 is comprised principally of a movable electrode 7 which moves between a fixed electrode 5 and a ground electrode 6. The fixed electrode 5 is connected to a source-side conductor 8 through a connecting conductor 8A comprised of a flexible conductor. The movable electrode 7 is connected to its corresponding load-side conductor 9 through a flexible conductor 34, and the load-side conductor 9 is connected to its corresponding cable head 10 provided outside the grounded vacuum container. Further, the movable electrode 7 is mechanically connected to a movable blade 11 and rotated in upward and downward directions or in left and right directions according to the rotation of the movable blade 11 driven by an operation mechanism unit 31.

When the movable electrode 7 is moved from the fixed electrode 5 to the ground electrode 6, it stops at four positions shown in FIG. 2. According to the rotation of the movable electrode 7, the movable electrode 7 is energized at a throwing position Y1 at which it contacts the fixed electrode 5 and rotated to the side below the throwing position Y1. Thereafter, the movable electrode 7 is separated or disconnected from the fixed electrode 5 at a cut-off position Y2 to thereby cut off current while producing arc. The movable electrode 7 is also rotated to the lower side so as to be separated from the fixed electrode 5 at a disconnection position Y3, so that the movable electrode 7 no produces an electrical breakdown and keeps an isolation distance at which a worker does not receive an electric shock on the load conductor side. The movable electrode 7 is further rotated so as to contact the ground electrode 6 at a ground position Y4. The disconnection position Y3 is omitted and the movable electrode 7 may be moved from the cut-off position Y2 to the ground position Y4. Since the movable electrode 7 can take the four positions continuously in one operation in a vacuum corresponding to high insulator while it is being turned from the fixed electrode 5 to the ground electrode 6, it is easy to operate. Further, since the movable electrode 7, fixed electrode 5 and ground electrode 6 are assembled into one place, the vacuum switch gear can be reduced in size. If the disconnection position Y3 is provided, then the worker is safe even when contacted the load-side conductor 9 where in two-line power reception having different-source butt, e.g., two systematic sources, a phase switch gear 2X for either one of the lines is in operation at the throwing position Y1 and a phase switch gear 2Y for the other thereof is during standby at the disconnection position Y3. Since the worker can operate continuously even when the phase switch gear is changed from during standby to operation or from during operation to standby, the operating speed of the vacuum switch gear is fast and the operation is easy. Further, a carried current is detected by a current transformer 13 and a protection relay 14 is activated to trip an operation mechanism unit (no shown), thereby coping even with a systematic accident.

A principal part of the grounded vacuum container 4 comprises a conductor such as stainless steel or the like and is connected to ground E. Thus, even when the worker repairs and checks the switch gear, then the worker can operate safely. A longitudinally-extending side 4A of each grounded vacuum container has a rectangular sectional form longer than the other side (height) 4B. Further, the width 4C of the grounded vacuum container has a vertically long substantially oval form as shown in FIG. 3. Thus, the mechanical strength of the grounded vacuum container 4 is 3increased and the thickness of the wall of the grounded vacuum container is made thin to bring the grounded vacuum container into less weight. The vacuum buses 12' for the respective phases extend in directions orthogonal to the longitudinally-extending sides 4A of the respective phase vacuum switch gears 1, 2 and 3. An operation equipment room or chamber 104 for driving the movable blade 11 is disposed on one-end sides of the transversely-extending sides 4C of the respective phase vacuum switch gears 1, 2 and 3.

Since the respective phase vacuum switch gears 1, 2 and 3 are identical in structure to each other, only the structure of the vacuum switch gear 2 corresponding to one phase will be explained. The description of other vacuum switch gears 1 and 3 will be omitted. Since the fixed electrode 5, ground electrode 6 and load-side conductor 9 are disposed on the upper and lower sides of one side 4A (in longitudinal direction) inside the grounded vacuum container 4, the other side 4B of the grounded vacuum container 4, i.e., a vertical size thereof can be reduced. The distance between the movable electrode 7, the load-side conductor 9 and the cable head 10 can be reduced owing to the flexible conductor 34. As a result, the electrical resistance is low, generated heat is reduced, and each vacuum switch gear can be brought into less size. The fixed electrode 5 and the ground electrode 6 are disposed in association with each other, and the movable electrode 7 is disposed therebetween. Further, the movable electrode 7 is rotated between both electrodes so as to be connected to or disconnected from both electrodes.

The ground electrode 6 is provided with a groundside bottom fitting 15 on one end side thereof and has a ground-side bushing 16 open on the other end side thereof, which is comprised of a ceramic material. A ground-side closing fitting 18 attached to a flange 17 provided on the outer periphery of the ground-side bushing 16 is welded to the grounded vacuum container 4, and the ground electrode 6 is supported by the grounded vacuum container 4. A ground-side bellows 19 and a spring 20 and the ground electrode 6 are disposed within the ground-side bushing 16. The ground electrode 6 extends through the ground-side bottom fitting 15 so as to extend outside and has an end connected to a ground-side cable 22 by a screw. The ground-side cable 22 is connected to the vacuum switch gear 100. When the ground electrode 6 on the side opposite to it is pressed toward the ground-side bottom fitting side, the spring 20 also contracts together with the ground-side bellows 19. At this time, however, the spring 20 always presses the ground electrode 6 in a movable electrode direction owing to its contracted force.

The fixed electrode 5 displaced in association with the ground electrode 6 is supported by a fixing-side insulated cylinder 25 composed of a ceramic material. A fixing-side closing fitting 26, which supports the other end of the fixing-side insulated cylinder 25, is fixed to its corresponding grounded vacuum container 4 by a brazing filler metal. A fixing-side fitting 24 and the fixing-side closing fitting 26 are attached to both ends of the fixingside insulated cylinder 25 in advance. The fixed electrodes 5 corresponding to three phases and external conductors 8 corresponding to three phases, which are respectively placed in different positions, are respectively connected to one another by connecting conductors 8A. The fixed electrodes 5 can be placed in the same place. Each external conductor 8 can be placed in an arbitrary position with the fixed electrode 5 as a reference position, thus making it possible to ensure the. degree of freedom of design. The fixed electrode 5 can be placed in a position at which the assembly of the source-side conductor 8 is easy. The relationship between the flexible conductor 34 and the load-side conductor 9 is also the same as above.

The movable electrode 7 disposed between the ground electrode 6 and the fixed electrode 5 is supported by a moving-side insulated cylinder 29 composed of a ceramic material through moving-side fittings 28. The moving-side fittings 28 are attached to both ends of the moving-side insulated cylinder 29. The movable blade 11 and the moving-side bellows 30 area attached to the moving-side fittings 28 on one side thereof. The movable blade 11 attached to the grounded vacuum container 4 on the other side of the moving-side bellows 30 is surrounded by the retractable moving-side bellows 30 and extends through the grounded vacuum container 4 so as to extend to the outside. The moving-side bellows 30 serves so as to rotate the movable blade 11 in left and right directions or in upward and downward directions through a main shaft 11A attached to the movable blade 11. The movable blade 11 is rotated with the main shaft 11A as the fulcrum so as to be connected to or disconnected from the ground electrode 6 and the fixed electrode 5, thereby performing electrical turning on and off.

The movable blade 11 is rotated with the main shaft 11A as the fulcrum owing to the driving of the operation mechanism unit 31 coupled to the tip of the movable blade 30. An operating shaft 32 couples the movable blade 11 and the operation mechanism unit 31 to each other. The operation mechanism unit 31 is placed within the above-described operation mechanism room. Incidentally, a structure may be used in which a movable electrode is simply attached to the tip of a movable blade. In this case, part of either one of the movable blade and the operation mechanism unit needs insulating means for cutting off current, e.g., the moving-side insulted cylinder 29. An advantage is brought about in that as compared with the case in which no current flows in the movable blade and the operation mechanism unit, design set in consideration of heat-based deformation, e.g., mechanical rigidity can be reduced.

The tip of the movable electrode 7 and the load-side conductor 9 are connected to each other by the flexible conductor 34. The load-side conductor 9 extends through a load-side bushing 35 composed of a ceramic material so as to be connected to the cable head 10. Load-side closing fittings 36 and 36' are attached to an end of the load-side bushing 35. The load-side closing fitting 36 is welded to and supported by the periphery of an opening defined in the grounded vacuum container 4 with a brazing filler metal. A ground metal layer 37 is provided over the surface of the ceramic material for the load-side bushing 35 exposed inside the grounded vacuum container 4 so that leakage current flows into ground E through the grounded vacuum container 4. Thus, even if a worker contacts the cable head 10, a safety measure is taken so as to avoid the occurrence of danger.

The operation of the vacuum switch gear 2 will next be described with reference to FIG. 2. The movable electrode 7 is placed in the cut-off position Y2 shown in FIG. 2, which is provided between the ground electrode 6 and the fixed electrode 5 as shown in FIG. 1. A place near the ground electrode 6 as viewed from the cut-off position Y2 is equivalent to the disconnection position Y3. Since the vacuum switch gear serves as a disconnecting switch at this position, it is not necessary to provide the disconnecting switch DS, so that the vacuum switch gear 2 can be reduced in size. The movable electrode 7 is turned from this position as shown in FIG. 2 so that the so-called ground position Y4 where the movable electrode 7 has contacted the ground electrode 6, is reached. The ground electrode 6 is always pressed in the movable electrode direction by the spring 20. The movable electrode 7 is turned in an opposite direction as viewed from the ground position Y4 as shown in FIG. 2. A throwing position where the movable electrode 7 is in contact with the fixed electrode 5, is Y1. The movable electrode 7 makes contact with the fixed electrode 5 at the throwing position Y1 and is also connected to the load-side conductor 9. In this case, a current path for supplying power from the throwing position Y1 where the fixed electrode 5 and the movable electrode 7 contact each other to the load-side conductor 9 through the flexible conductor 34 by bypassing the movable blade 11 can be greatly reduced. As a result, the electrical resistance becomes low and hence power dissipation and generated heat could be reduced correspondingly.

A system is considered in which the power is always supplied to the load at the throwing position Y1, this operating hour is longer than time intervals during which the movable electrode 7 is used at other positions, and the movable electrode 7 is directly brought into sliding contact with the load-side conductor 9 in place of the use of the flexible conductor 34. In this system, the movable electrode 7 directly slides onto the load-side conductor 9 to thereby continuously supply current in a state in which the movable electrode 7 and the load-side conductor 9 are kept in contact with each other. Thus, there is a possibility that the movable electrode 7 and the load-side conductor 9 will be welded or deposited due to heat generated by the current. As a result, the turning force of the operation mechanism unit 31 becomes large to separate the welded movable electrode 7 and load-side conductor 9 from each other, so that the operation mechanism unit 31 is brought into a large size. Therefore, the vacuum switch gear 2 increases in size and cost. When the electrodes are allowed to slide while heat is being generated, both electrodes are heavily worn away and decrease in life.

When the movable electrode 7 slides on the load-side conductor 9, metal particles produced from the movable electrode 7 and the load-side conductor 9 are diffused within the vacuum container and remains behind, so that dielectric breakdown becomes easy to occur. On the other hand, when the flexible conductor 34 used for avoiding the direct sliding of the movable electrode 7 on the load-side conductor 9 in the present invention connects between the load-side conductor 9 and the movable electrode 7, there is no deposition between the movable electrode 7 and the load-side conductor 9. Further, the turning force of the operation mechanism unit 31 does not increase as compared with above, and the operation mechanism unit 31 can be also reduced in size. The movable electrode 7 and the load-side conductor 9 also increase in life and hence an advantage is brought about even economically. Since the flexible conductor 34 connects between the load-side conductor 9 and the movable electrode 7 in the shortest distance, no metallic vapour occurs when the movable electrode 7 slides on the load-side conductor 9 as described above. It is apparent that a current cut-off characteristic is greatly improved. Further, the grounded vacuum container 4 can be reduced in size.

As measures against the metal vapor, the fixed electrode 5 and the ground electrode 6 and load-side conductor 9, and the movable electrode 7 connected to and disconnected from both electrodes are placed on one and other sides of the grounded vacuum container. Further, the grounded vacuum container is constructed so that a capacity C1 on one side, i.e., upper side of one side in the grounded vacuum container as viewed from the movable electrode 7 placed in the center 0 between both electrodes becomes greater than a capacity C2 on the other side. Thus, a short-circuit current or the like, which flows through the fixed electrode 5 and the movable electrode 7 and loadside conductor 9, is cut off. Since the ground electrode 6 simply allows the residual charge on the source side and induced current to flow into the ground, the metallic vapour is less generated as compared with the fixed electrode side, the capacity C1>the capacity C2, the diffusion of the metallic vapour at the capacity C1 is facilitated, and the recovery of insulation is fast.

As a result of the connection between the fixed electrode 5 and the source-side conductor 8 by the connecting conductor 8A, the fixed electrode 5 can be placed in the same position for each phase, and at which position in each phase the source-side conductor 8 should be connected to the vacuum bus 12' or connecting conductor 12 with the fixed electrode 5 as the reference position, can be arbitrarily determined. At which position the source-side conductor 8 should be placed as seen from the reference position of the fixed electrode 5, is easily understood, and an easy-to-design and manufacture advantage is brought about. As a result of connections between the fixed electrodes 5 at the same position in each individual phases and the source-side conductors 8 at different positions by the connecting conductors 8A, for example, the vacuum buses 12' connected to the source-side conductors 8 corresponding to the plurality of phases at one sides 4A of the grounded vacuum containers 4 are placed in a direction orthogonal to one sides of the grounded vacuum containers 4, and the connecting portions 40 corresponding to the respective phases between the source-side conductors 8 and the vacuum buses 12' are slopingly placed so that the connecting portions 40 corresponding to the respective phases are not lapped, thereby making it possible to easily perform connecting work. The vacuum buses 12' and connecting conductors 12 connected to the source-side conductors corresponding to the plurality of phases at one sides of grounded vacuum containers 4 extend along one sides on each grounded vacuum container, the connecting portions 40 corresponding to the three phases are identically placed in parallel, and connecting work can be easily carried out in a manner similar to above.

Connections between the source-side conductor 8 and the vacuum buss 12' will be explained with reference to FIGS. 3 and 4. The source-side conductor 8 whose one end is connected to the connecting conductor 8A, extends through the source-side supporting portion 41 composed of the ceramic material so as to be connected to the vacuum bus 12' at the connecting portion 40. The closing fittings 42 are provided at the tip and in the course of the source-side supporting portion 41. One closing fitting 42 is connected to the source-side conductor 8 with the brazing filler material to maintain vacuum within the corresponding grounded vacuum container 4.

The connecting conductors 12 for the pair of vacuum buses 12', which extend in the direction orthogonal to the tip or leading portion of the source-side conductor 8 extending in the vertical direction are supported by the connecting portion 40. A screw hole is defined in the leading portion of the source-side conductor 8 and the tips of the pair of connecting conductors 12 having through holes corresponding to the screw hole are placed so as to be stacked to each other. A screw bar 44 is inserted into these holes and a nut 45 attached to the screw bar 44 is turned and fastened, so that the pair of vacuum buses 12' can be supported at the tip of the source-side conductor 8.

As to the connecting conductors 12 for at least one pair of vacuum buses 12' extending in direction opposite to each other, connecting pieces 12A and 12B provided so that the thickness thereof on the mutually-superimposed one end sides is made thinner than that of the non-superimposed bus, are superimposed on each other, and the connecting pieces 12A and 12B are fixed by the connecting portion 40. Thus, the connecting pieces 12A and 12B can be prevented from protruding from each vacuum bus 12. Further, the heights or widths of the connecting portion 40 and an insulation holding portion 50 can be lowered as compared with the case in which the connecting pieces 12A and 12B are not provided.

The connecting conductors 12 for the pair of vacuum buses 12' respectively extend through bus-side supporting portions 46 composed of a ceramic member. Closing fittings 47 are provided at the tips and in the course of the bus-side supporting portions 46. One of the closing fittings 47 and a bellows 49 are connected to each other by a brazing filler metal, and the bellows 49 is connected to an outer housing 60 on the other side by welding. A protrusion 53 provided at the connecting conductor 12 for each vacuum bus 12' provided on the side opposite to the connecting portion 40, and a junction portion 55 composed of an elastic material are connected between the protrusion 53 and a concave portion 54 of the other vacuum bus 12, corresponding thereto by brazing. The junction portion 55 serves so as to expand and contract according to an increase or decrease in the load of current flowing through each vacuum bus 12 and the junction portion 55. However, when the junction portion 55 expands in particular, the protrusion 53 collides with the concave portion 54, whereby the junction portion 55 prevents metal cut powder or dusts produced at this time from being discharged to the outside, and prevents the occurrence of a short-circuit accident beforehand.

A protruding adjuster 51 with a threaded groove and a screw bar 44 are attached to external and internal ends of the insulation holding portion 50 by turning them with a spanner or the like.

Insulating rubber 52 is fit on the outsides of the source-side supporting portion 41, the bus-side supporting portion 46 and the insulation holding portion 50 in a tight state. The insulating rubber 52 has integrally-defined four insertion holes which allow the source-side supporting portion 41, the bus-side supporting portion 46 and the insulation holding portion 50 to insert therethrough. An insulated rubber cover mixed with ground metallic powder may be provided over the surface of the insulating rubber 52 used as an elastic body so as to take a measure for avoiding an electric shock even if the worker contacts it. The insulated cover has a first insulating coating portion 52A having a through hole extending in one direction and a second insulating coating portion 52B having a second through hole orthogonal to the first through hole. Both the insulating coating portions are continuous. At least one pair of vacuum buses 12 extending in directions opposite to each other are fit in the through hole of the first insulating coating portion 52A. The vacuum buses 12 are surrounded by the first insulating coating portion. The external conductor 8 extending in the direction orthogonal to the vacuum buses 12 is fit in the through hole of the second insulating coating portion 52B. Further, the external conductor 8 is surrounded by the second insulating coating portion 52B. The connecting portion 40 in which the connecting pieces 12A and 12B by which one ends of the respective buses are superimposed on one another, and the source-side conductor 8 are fixed by tightening means 44 and 45, is disposed in a place at which both through holes cross each other. Therefore, an advantage is brought about in that the insulation for the source-side conductor 8, vacuum buses 12, connecting portion 40, etc. can be carried out by the insulated cover with ease and in a short time.

When the adjuster 51 is rotated, the insulated rubber 52 is pressed correspondingly by an inclined portion 50A of the insulation holding portion 50 and thereby spread so as to expand outside, so that the insulation holding portion 50 and the insulated rubber 52 are brought to a closely fit state. Since the adhering work and tightening work are carried out by simply rotating the adjuster 51 from the outside, working is easy to perform. In this condition, the periphery of each vacuum bus 12' is maintained under vacuum.

Thus, each vacuum bus 12' holds its insulation by vacuum and is capable of being reduced in size by such an extent that it is unnecessary to cover each conductor with an insulating member such as a synthetic resin. Further, since the present invention can be used even if the earthing or grounding device and the disconnection position are omitted, the grounded vacuum container and the operation mechanism unit can be further reduced in size. It is therefore possible to naturally bring the circuit switch gear into less size. The vacuum switch gear according to the present invention can be used even as a circuit breaker for allowing a movable electrode to be opened and closed to a fixed electrode, a switch such as a vacuum breaker or the like, a disconnector for allowing a fixed electrode to be connected to or disconnected from a movable electrode, a ground switch, and a single product such as a switch.

Figure 7:
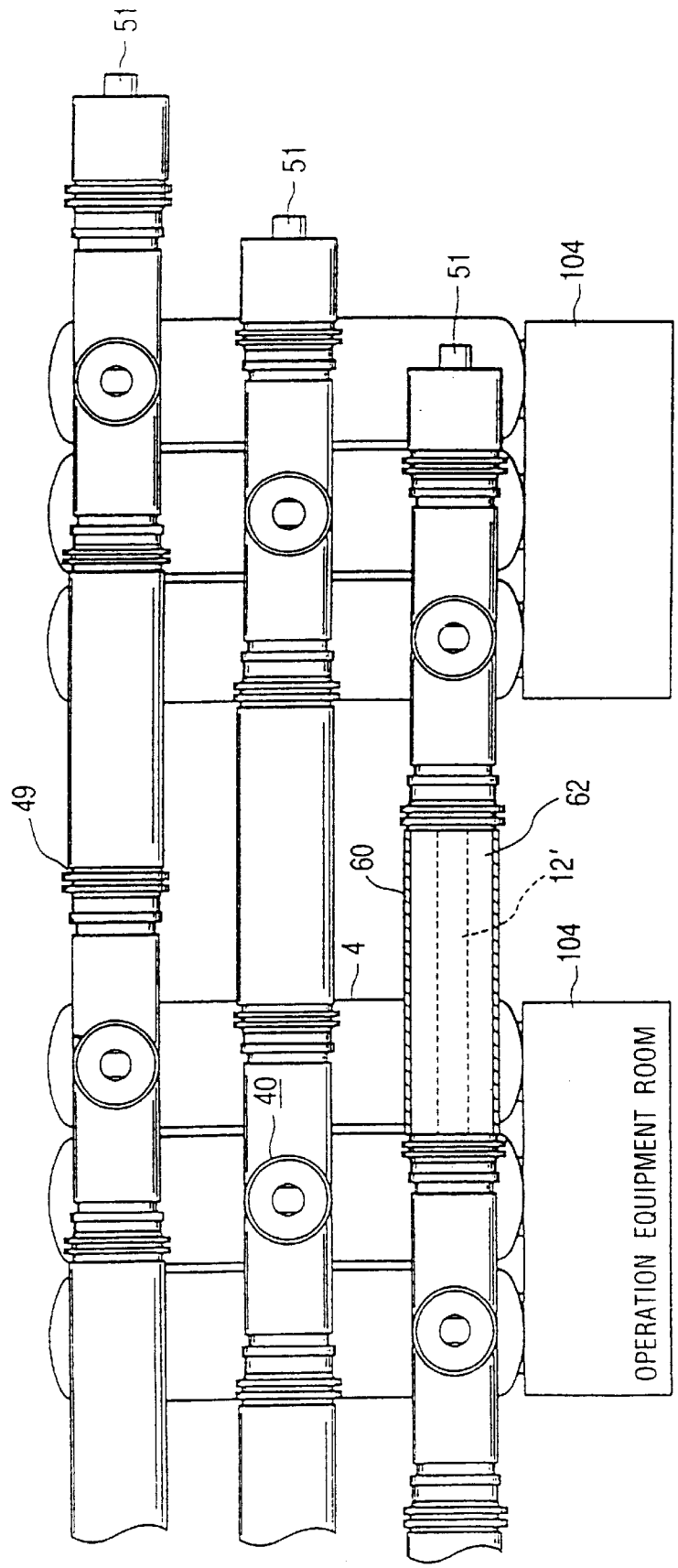
FIG. 7 is a schematic plan view of a vacuum switch gear system in which a plurality of the vacuum switch gear units each shown in FIGS. 1 and 5 are connected to one another.

FIG. 7 is a plan view of a vacuum switch gear system constructed so that the vacuum switch gear unit shown in FIGS. 1 and 5 is connected in plural form. In the drawing, the plurality of units are connected to one another via connecting portions so as to constitute an intended circuit. Incidentally, the ends of the units are sealed by inserting the connecting structures each having the adjusting part 51 and the elastic body 52 shown in FIGS. 3 and 4 into their corresponding bus covers or housing 60. While vacuum buses 12' are all placed linearly in the drawing, the buses can be bent as needed so as to reach an arbitrary circuit configuration. Each vacuum bus 12' is placed in a vacuum 62 lying within a vacuum ground bus container 60 made of stainless steel. Although not shown in the drawing, the vacuum buses 12' are supported by insulators at both ends of the housing 60.

What is claimed is:

1. A vacuum switch gear, comprising:

a vacuum container;

a fixed electrode placed within said vacuum container and connected to an external conductor, said external conductor being insulated by a solid insulation;

a movable electrode adapted to be connected to and disconnected from said fixed electrode;

an operation mechanism unit for driving said movable electrode; and a pair of buses connected to said external conductor;

wherein a portion for connecting said buses and said external conductor is provided so that an end of the external conductor insulated by the solid insulation and extended from said vacuum container and the pair of buses connected to the end are supported by an interface insulation.

2. A vacuum switch gear, comprising:

a vacuum switch including;

a grounded vacuum container;

a fixed electrode placed within said grounded vacuum container and connected to an external conductor, said external conductor being insulated by a solid insulation;

a movable electrode adapted to be connected to and disconnected from said fixed electrode;

a ground conductor;

a load conductor; and an operation mechanism unit for driving said movable electrode; and a pair of buses connected to said external conductor;

wherein a portion for connecting said buses and said external conductor is provided so that an end of the external conductor insulated by the solid insulation and extended from said grounded vacuum container and the pair of buses connected to the end are supported by an interface insulation.

3. A vacuum switch gear as claimed in claim 1, wherein said portion has a bolt inserted into said end of said external conductor and a structure for adhering an elastic body as said interface insulation to said solid insulation by the motion of said bolt inserted through respective ends of said pair of buses.

4. A vacuum switch gear as claimed in claim 1, further comprising an inserter attached to an insulation holding portion and an adjuster, wherein said insulation holding portion and said inserter are moved according to the rotation of said adjuster so that said solid insulation presses the interface insulation to adhere said solid insulation and interface insulation together.

5. A vacuum switch gear as claimed in claim 1, wherein said insulation holding portion has an inclined surface in which a sectional area thereof successively decreases toward a center of said connecting portion.

6. A vacuum switch gear as claimed in claim 1, wherein surfaces of said solid insulation and said interface insulation contain ground metallic powder.

7. A vacuum switch gear as claimed in claim 1, wherein said buses and said connecting portion are vacuum insulated.

8. A vacuum switch gear unit, wherein two or more vacuum switch gears each as claimed in claim 1, are utilized in combination.

9. A vacuum switch gear system, wherein said buses of said switch gear unit as claimed in claim 8 are connected to one another.

10. A vacuum switch gear unit, comprising:

a vacuum switch gear including;

a vacuum container placed within a grounded vacuum container or a gas-insulated ground container;

a fixed electrode placed within said vacuum container and connected to an external conductor, said external conductor being insulated by a solid insulation;

a movable electrode adapted to be connected to and disconnected from said fixed electrode;

an operation mechanism unit for driving said movable electrode; and a pair of buses connected to said external conductor;

wherein a portion for connecting said buses and said external conductor is provided so that an end of the external conductor insulated by the solid insulation and extended from said vacuum container and the pair of buses connected to the end are supported by an interface insulation, and wherein said vacuum switch gear and said pair of buses are placed in plural form.

11. A vacuum switch gear unit, comprising:

a vacuum switch gear including;

a vacuum container placed within a grounded vacuum container or a gas-insulated ground container;

a fixed electrode placed within said vacuum container and connected to an external conductor, said external conductor being insulated by a solid insulation;

a movable electrode adapted to be connected to and disconnected from said fixed electrode;

a ground conductor; and a load conductor electrically connected to said movable electrode;

an operation mechanism unit for driving said movable electrode; and a pair of buses connected to said external conductor;

wherein a portion for connecting said buses and said external conductor is provided so that an end of the external conductor insulated by the solid insulation and extended from said vacuum container and the pair of buses connected to the end are supported by an interface insulation.

12. A vacuum switch gear unit, wherein plural ones of said vacuum switch gear as claimed in claim 11 placed in line.

13. A vacuum switch gear system, wherein said buses of said vacuum switch gear unit as claimed in claim 12 are connected in series to buses of a vacuum switch gear unit adjacent thereto.

* * * * *